United States Patent [19]

Steiner

[11] 4,219,537

[45] Aug. 26, 1980

[54] DESULFURIZATION AND LOW TEMPERATURE REGENERATION OF CARBONACEOUS ADSORBENT

[75] Inventor: Peter Steiner, Edison, N.J.

[73] Assignee: Foster Wheeler Energy Corporation, Livingston, N.J.

[21] Appl. No.: 956,458

[22] Filed: Oct. 31, 1978

[51] Int. Cl.$^2$ ...................... C01B 17/02; C01B 17/00; B01J 8/00

[52] U.S. Cl. .................................... 423/569; 423/244; 252/411 S

[58] Field of Search ............... 423/244 A, 244 R, 563, 423/569; 252/411 S, 419

[56] References Cited

U.S. PATENT DOCUMENTS

| | | | |
|---|---|---|---|
| 1,832,217 | 11/1931 | Joseph | 252/411 S |
| 2,933,454 | 4/1960 | Repik | 252/419 |
| 3,396,509 | 8/1968 | Tamura et al. | 423/244 X |
| 3,544,263 | 12/1970 | Ninomiya et al. | 423/244 A |
| 3,667,910 | 6/1972 | Equchi | 423/244 |
| 3,917,799 | 11/1975 | Torrence | 423/244 R |

FOREIGN PATENT DOCUMENTS 1390694  4/1975  United Kingdom ..................... 423/563

Primary Examiner—O. R. Vertiz
Assistant Examiner—Gregory A. Heller
Attorney, Agent, or Firm—Marvin A. Naigur; John E. Wilson; John J. Herguth, Jr.

[57] ABSTRACT

A gas desulfurization process is disclosed wherein a particulate, partially oxidized coal is used as an adsorbent for gaseous sulfur oxides and is regenerated by contact with a low temperature recycled stream of its own desorbed off-gas containing at least 40% steam and 15% $SO_2$. A bleed stream of the desorbed off-gas may be reacted with coal at 1150° F. to 1550° F. to partially oxidize the coal and transform it into an adsorbent suitable for use in the adsorber.

15 Claims, 2 Drawing Figures

DESULFURIZATION AND LOW TEMPERATURE REGENERATION OF CARBONACEOUS ADSORBENT

BACKGROUND OF THE INVENTION

This invention relates generally to pollution control systems and, more particularly, to a pollution control system for the removal of sulfur oxides from flue gases and the reduction of the sulfur oxides to sulfur.

It is known in the field of atmospheric pollution control to use an adsorptive process for the desulfurization of flue gases in which the sulur-containing material is adsorbed in the porous system of an activated carbonaceous material. In one such process, adsorption is carried out in a gas-solid contacting device in which the flue gases are contacted with activated char and sulfur dioxide in a diluted form in the gas stream passing through the activated char is adsorbed and oxidized to sulfuric acid by the oxygen and water vapor present in the gas stream. Other acid gases, such as nitrogen oxides, are similarly adsorbed, and particulate matter entrained in the gas stream is filtered by passage of the stream through the activated char.

In the prior art process developed by Bergbau Forshung and depicted in FIG. 1, the acid-laden or saturated char is thermally regenerated in a desorption vessel, or the like, by a process in which the sulfur-containing material is chemically changed in form, resulting in the decomposition of sulfuric acid to sulfur dioxide and water, whereby a portion of the carbonaceous adsorbent is oxidized to carbon dioxide. The by-product of the regeneration process is a gas stream containing 20–30% by volume of sulfur dioxide, which is directed to an off-gas treatment facility for further processing.

The prior art system of FIG. 1 is composed of three basic subsystems: adsorption, regeneration or desorption, and off-gas treatment. In the adsorption subsystem, an adsorber 10 receives flue gases from the vapor generator after they have passed through a particulate matter separator, or the like (not shown), and the flue gases are contacted with adsorbent material in pellet form loaded into the adsorber. The adsorbent material used in the adsorber 10 is usually in the form of a preoxidized bituminous coal, or activated char.

In the regeneration subsystem, an inert, heat exchange medium, such as sand, is heated in a sand heater 12 to a predetermined, elevated temperature, and is supplied to a regenerator 14, through which the heated sand and the saturated char pellets pass in intimate contact. This contact raises the temperature of the mixture to a predetermined level to cause the sulfuric acid in the porous system of the activated char to be converted first to sulfuric acid anhydrate ($H_2SO_3$) and then to $SO_2$, and the nitrogen compounds to $N_2$. A high-concentrated, $SO_2$-rich off-gas stream is produced, containing 20–30% by volume, and is usually directed to an exterior unit for further processing. The sand/char mixture leaving the regenerator 14 goes through a separator 16, which separates the regenerated char from the sand. The separated sand is returned to the sand heater 12, again heated to the proper elevated temperature, and recycled into the regenerator 14. The separated char is directed to a char cooler 18, in which it is cooled and recycled to the adsorber 10 for re-use.

In this type of prior art system, the $SO_2$-rich off-gas is usually treated further to produce elemental sulfur, which is storable and which has certain commercial applications. To this end the off-gas can be reacted with crushed coal to produce the elemental sulfur. For example, in the system disclosed in the above-identified application, the $SO_2$-rich off-gas is introduced into a reactor, shown in general by the reference numeral 20 in FIG. 1, and is initially reacted with crushed coal which is continuously supplied to the vessel to yield gaseous elemental sulfur, which is then passed to a condenser 22 and condensed into liquid sulfur. The liquid sulfur may be stored in appropriate containers, or may be cooled into solid form.

In the above-described system of FIG. 1, a certain quantity of the activated char is consumed by the chemical reaction which occurs in the regenerator 14, and as a result of the continuous recyling of the regenerated char, a portion of this material becomes physically reduced to such a size which renders it ineffective in the adsorption process. Thus, a source of additional activated char is provided to the adsorber 10 to replenish the char consumed in the regenerator 14 and to make up for the quantity which is physically reduced. (In the reactor 20, the crushed coal supplied thereto is consumed in the reaction process, yielding coal ash as a by-product, which is not otherwise utilized in the process.)

The major problem with the prior art process of FIG. 1 resides in the inherent difficulty in separating the regenerated adsorbent from the sand for recycle to the adsorber. Also, with increased emphasis on energy and natural resource conservation, a need exists for replacing that commercial process with a process which is more energy efficient, specifically, one which achieves regeneration with like efficiency at lower temperature.

It is also well known in the art to regenerate activated carbons by contact with a hot regenerating gas. For example, U.S. Pat. No. 2,933,454 discusses regeneration with mixtures of air and steam. However, where it is desirable to treat the desorbed gas for recovery, for example, of sulfur value, regeneration of the adsorbent by contact with a hot regenerating gas poses a problem of dilution of the desorbed volatiles to the point where they cannot be economically treated for the recovery of some value contained therein. One solution to this problem is disclosed in U.S. Pat. No. 3,667,910 wherein it is taught that the regenerating gas may be recirculated through the desorber to elevate the concentration of sulfur dioxide to facilitate recovery (Col. 4, lines 40–45). The problem with this prior art process is that to achieve adequately effective regeneration, carbon monoxide gas and/or hydrogen gas must be continuously generated and combined with the circulating desorbent.

SUMMARY OF THE INVENTION

It has now been discovered that a partially oxidized coal may be used as an adsorbent for flue gas desulfurization and can be effectively regenerated by contact with its own desorbed gas at a temperature within the range of 800–1000° F. if the steam concentration of that gas is at least 40 mole percent. In practice, the spent carbonaceous adsorbent is continuously passed through a regeneration zone as a non-static bed wherein it is first counter-currently contacted with an initial charge of a circulating inert gas. As the desorbed gas is recycled through the regeneration zone, the gas in the loop is caused to approach the concentration of the desorbed volatiles by removing a gas bleed stream from the loop at a volumetric flow rate equal to the rate at which the volatiles are desorbed. In a preferred embodiment, the gas bleed stream, containing at least 40% steam and at least 15% $SO_2$, is passed into a reaction zone wherein it is contacted with raw coal at a temperature within the range of from 1150° F. to 1550° F. to convert the sulfur dioxide to gaseous elemental sulfur and to partially oxidize the coal which may then be used as adsorbent.

Accordingly, it is an object of the present invention to provide a flue gas desulfurization process employing a carbonaceous adsorbent which can be regenerated by gas generated within the regeneration loop, i.e., a self-contained, closed-(gas)loop regeneration cycle.

It is a further object of the invention to operate a carbonaceous adsorbent regeneration system without need for a separately generated regeneration gas.

It is yet another object of the present invention to provide for desorption of sulfur dioxide from a carbonaceous adsorbent in a concentration suitable for sulfur recovery while avoiding the solids separation problem inherent to the prior art hot-sand method.

It is still a further object of the present invention to develop a desulfurization process in which the adsorbent can be regenerated at a relatively low temperature.

These and other objects of the present invention will become apparent to those skilled in the art from a reading of the following specification.

BRIEF DESCRIPTION OF THE DRAWINGS

The above description, as well as further objects, features and advantages of the present invention, will be more fully appreciated by reference to the following description of a presently-preferred embodiment illustrative of the present invention, when taken in connection with the accompanying drawings, wherein.

DESCRIPTION OF THE PREFERRED EMBODIMENTS

The carbonaceous adsorbent used in the present invention is a partially oxidized coal. Exemplary of such adsorbents is vanadium-treated anthracite derived RECOAL TM (Foster Wheeler trademark for by-product coal from its RESOX ® sulfur dioxide reduction process) which is preferred from the viewpoint of its low cost. Another advantage of RECOAL TM is in its relatively high resistance to attrition and the fines which it does generate are relatively coarse and easily separated. This RECOAL TM may have 0.04 to about 0.25 weight % V deposited on it and may be prepared by its immersion in a sulfuric acid solution of $V_2O_5$ and "drying" at about 1400° F. An adsorbent preferred from the viewpoint of its superior adsorption capacity is a char commercially available from Bergbau Forschung (BF). The BF char is derived from bituminous coal which is crushed and then partially oxidized.

The regeneration zone is operated with a maximum temperature, i.e., at the gas inlet, within the range of 800°–1000° F. and, preferably, within a range of 800°–850° F.

The regenerating gas loop is initially charged with an inert gas such as carbon dioxide, nitrogen or a mixture thereof. If desired, steam may be added to the initial charge. As the operation progresses, the initially charged gas will be gradually displaced by recirculated desorbed volatiles until a steady-state operation is achieved wherein the composition in the regenerating gas loop will be approxiately that of the desorbed gas.

By "steady-state operation" is meant that pressures at given points within the regenerator remain approximately constant. To achieve steady-state operation, gas is removed from the regenerator at a volumetric rate equal to that at which the volatiles are desorbed from the spent adsorbent in the regeneration zone. This is conveniently accomplished by a pressure-responsive control system with the regenerating gas loop maintained at approximately atmospheric pressure. Typically, the pressure at the suction of the regenerating gas blower (shown as 32 in FIG. 2) will be about 10" water (gauge) and about 75"–100" water (gauge) at the blower discharge.

In the desulfurization process of the present invention flue gas is routed through a dust collector and then through an adsorber wherein it is passed through a bed of carbonaceous adsorbent. The adsorber may be of any conventional type and may contain the carbonaceous adsorbent as a fixed bed, moving bed or fluidized bed.

Figure 1:
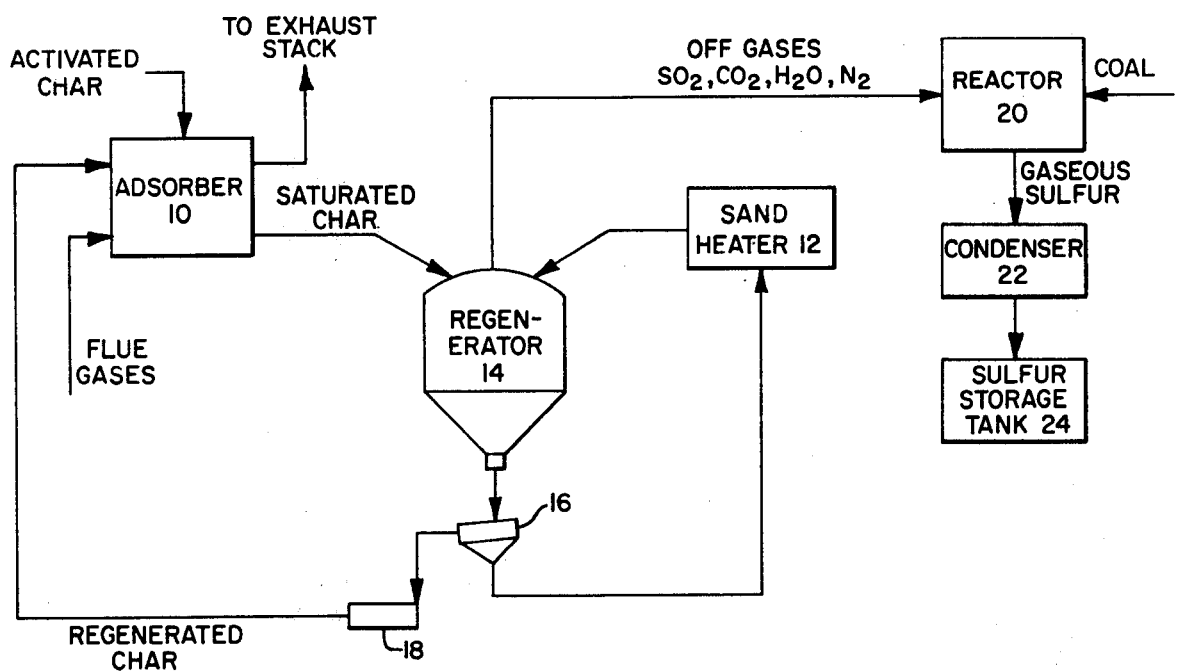
FIG. 1 is a schematic diagram showing the flow of materials in a pollution control system of the prior art for the removal of sulfur oxides in flue gases.
Figure 2:
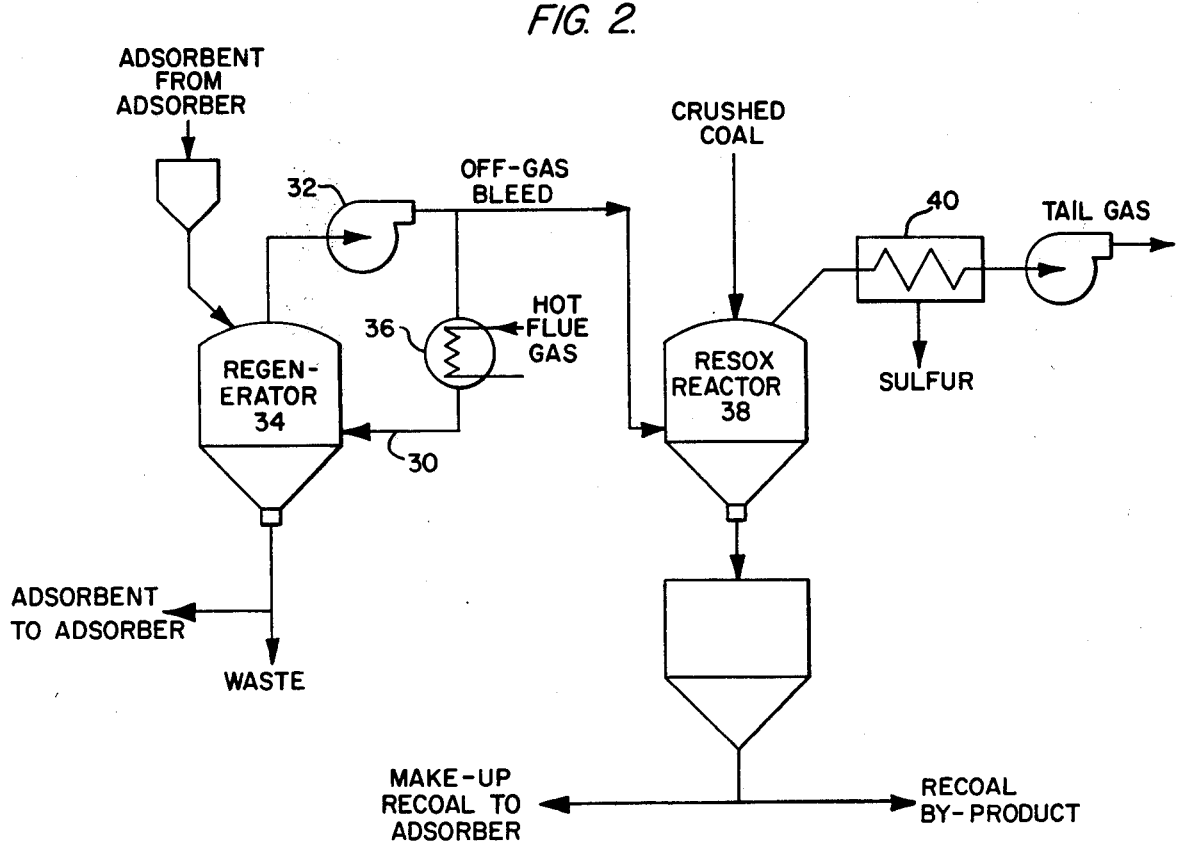
FIG. 2 is a schematic diagram showing the flow of materials in a preferred embodiment of the regeneration system invention.

The spent adsorbent from the adsorber is routed to the regeneration system of the present invention, a preferred embodiment of which is depicted in FIG. 2 of the drawings. The regeneration system includes a regenerating gas loop 30 which recycles, by means of blower 32, the main portion of the desorbed volatiles through the regenerator 34 and heat exchanger 36 which heats the gas entering the regenerator to 800°–1000° F., preferably to 800°–850° F. The gas in the regenerating gas loop, after it reaches steady-state will have the composition of the desorbed gas. This desorbed gas typically contains 20–65 mole % $SO_2$ (dry basis), 35–75 mole % $CO_2$ (dry basis) and 50 mole % or more $H_2O$ (steam). A portion of this gas is split off and routed to a RESOX ® reactor 38 wherein it is reacted with crushed coal at 1150° F. to 1550° F. to yield gaseous elemental sulfur which is then passed to a condenser 40 wherein it becomes liquified. Subsequently, the liquid sulfur may be solidified by further cooling.

The RESOX ® reactor 38 and regenerator 34 are preferably moving bed vessels, but they may also provide means for fluidized bed or static bed operation. The terminology "non-static bed", as used herein is meant to cover both moving bed operation and fluidized bed operation. For a definition of what is meant by moving bed operation refer to column 5, lines 36–41, of U.S. Pat. No. 2,883,333 issued Apr. 21, 1959 to R. C. Oliver.

A more detailed description of the RESOX ® process per se is provided in copending application U.S. Ser. No. 635,497 filed Nov. 26, 1975, now U.S. Pat. No. 4,147,762, the teachings of which are incorporated herein by reference.

In the embodiment of FIG. 2 both the elemental sulfur and the RECOAL TM absorbent are valuable by-products. The RECOAL TM is formed from raw crushed coal in the RESOX TM reactor wherein it is partially oxidized and imparted a surface porosity by the action of the $SO_2$, $O_2$, and steam in the bleed gas stream. The mole ratio of steam to $SO_2$ is preferably in the range of 2:1 to 3:1 and the contact time is preferably 5.1 to 9.1 seconds. The operating parameters are controlled to produce a RECOAL TM product containing 50–60% by weight of the original coal.

EXAMPLE 1

Anthracite derived RECOAL TM was soaked in a solution of 300 grams $V_2O_5$, 2000 cc sulfuric acid and 1000 cc water. The wet RECOAL TM was "dried" at 1400° F. in an electric furnace. In this manner three batches of RECOAL TM were prepared containing 0.11, 0.21 and 0.14 wt. % V, respectively. Batch No. 1 was prepared from a RECOAL TM which had been subjected to 50 cycles of $SO_2$ adsorption and steam regeneration at 1300° F. Batch No. 2 was prepared from a RECOAL TM that had been subjected to 61 cycles and batch No. 3 was prepared with fresh RECOAL TM.

During the adsorption portion of each test cycle, a simulated flue gas mixture composed of 0.2% $SO_2$, 15.0% $CO_2$, 3.0% $O_2$, 10.0% $H_2O$, and a balance of $N_2$ (percentages being volume percentages) was fed at 275° F. into a 2 cubic foot vessel filled with RECOAL TM adsorbent as a fixed bed. The gas residence time (open volume) was 6 seconds. Since two reactor volumes had been discharged during regeneration, two batchwise adsorption tests per cycle were required.

For regeneration, the reactor and its feed hopper were filled to capacity. This required three reactor volumes or batches of vanadium treated RECOAL TM. The startup bed, which was held stationary within the reactor, was brought to temperature within a circulating mixture of hot gases, composed of an initial charge of carbon dioxide and evolving off-gas. As the temperature increased, more gas was driven off the bed so that the composition of the gas within the loop eventually approached that of the off-gas. The recycle loop was maintained at constant pressure via its pressure control valve.

When the solids within the reactor vessel reached the proper temperature and test conditions were stabilized, the vibrating feeder was turned on and the withdrawal of the initial batch began. The second batch of the RECOAL TM which was stored on the bottom of the hopper, started to flow by gravity into the reactor vessel. The testing began when the second batch completely replaced the first batch and ended when the third batch completely displaced the second batch in the reactor vessel.

The third batch, which was now in the reactor, became the start-up batch for the regeneration test of the next cycle.

The time interval spent within the reactor vessel varied from 1.5 to 2.75 hours (dwell time) for the test batches of RECOAL TM.

The results are shown in Table 1.

EXAMPLE 2

The same 2 cubic foot vessel was again used as a boxed fixed bed adsorber and as a moving bed regenerator. In this test BF char was used as the adsorber. For adsorption, the recycle blower was isolated from the other components and a simulated flue gas mixture, identical to that employed in Example 1, was fed at 250° C. through the fixed bed adsorber filled with the BF char. The gas residence time (open volume) was again 6 seconds.

For regeneration, the synthesizing flue gas system was isolated from the other components and the loop was placed on line by circulating hot gases through the recycle loop. The blower and the fired heater, both part of the loop, provided the motive force and the necessary heat. The circulating gas was at first carbon dioxide but changed in composition to that of the regenerator off-gas as the bed approached steady-state operation with a gas inlet temperature at 850° F. Various batches of spent BF char from the adsorber, containing from 4.4 to 5.56% by weight sulfur dioxide were fed at feed rates as high as 60 pounds per hour, equivalent to a dwell time within the vessel of 1.3 hours. The recycle blower which, along with the solids feeder, determined the overall capacity of the power plant, circulated up to 10 scfm of gas while developing a discharge head of 75"–10" water (gauge).

During the adsorption portion of the test, the analysis of gas samples for sulfur dioxide content was accomplished with two on-stream Theta sensors, Model U.S. 5,000. The results of seven test runs are shown in Table 2 below.

TABLE 1

| | RECOAL | | | | | |
|---|---|---|---|---|---|---|
| CYCLE NO. | 1 | 2 | 3 | 4 | 5 | 6 |
| REGENERATION SEGMENT | | | | | | |
| Identification* | | | | | | |
| Start-Up Batch | 1-56-1 | 3-10-1 | 2-70-2 | 1-58-3 | 3-12-3 | 2-73-5 |
| Test Batch | 2-69-1 | 1-57-2 | 3-11-2 | 2-71-3 | 1-59-4 | 3-14-5 |
| Shut-Down Batch | 3-10 | 2-70 | 1-58 | 3-12 | 2-72 | 1-61 |
| Avg. Temp. - °F. | | | | | | |
| Inlet TR3 | 858 | 925 | 1003 | 973 | 1019 | 793 |
| TR4 | 589 | 697 | 655 | 560 | 759 | 585 |
| Mid TR5 | 465 | 579 | 554 | 507 | 667 | 550 |
| TR6 | | 430 | 429 | 377 | 518 | 463 |
| Outlet TR7 | 415 | 491 | 382 | 402 | 477 | 449 |
| Avg. Dwell Time - hr | 1.5 | 1.9 | 1.6 | 1.6 | 1.8 | 1.5 |
| Off-Gas Composition - Dry Mole % | | | | | | |
| $SO_2$ | 30.4 | 15.8 | 23.3 | 21.1 | 46.3 | 34.6 |
| $CO_2$ | 58.9 | 81.8 | 70.4 | 52.5 | 49.3 | 61.7 |
| $N_2$ | 10.0 | 2.15 | 5.8 | 25.5 | 4.0 | 3.3 |
| CO | 0.56 | 0.24 | 0.5 | 0.66 | 0.36 | 0.4 |
| COS | 0.011 | 0.015 | 0.015 | 0.016 | 0.011 | 0.015 |
| $CH_4$ | — | — | — | — | — | — |
| $H_2S$ | — | — | — | — | — | — |
| ADSORPTION SEGMENT | | | | | | |
| Start-Up Batch Identification | 1-57 | 3-11 | 2-71 | 1-59 | 3-13 | 2-74 |
| $SO_2$ Load - lb/100 lb | 2.71 | 2.46 | 2.86 | — | 2.36 | 3.07 |

TABLE 1-continued

RECOAL

| | | | | | | |
|---|---|---|---|---|---|---|
| Av. Adsorb. Temp. °F. | 268 | 267 | 275 | — | 275 | 277 |
| Test Hours | 20 | 15 | 15 | 15 | 15 | 15 |
| Test Batch | | | | | | |
| Identification | 2-70 | 1-58 | 3-12 | 2-72 | 1-60 | 3- |
| SO$_2$ Load - lb/100 lb | 2.16 | 2.4 | 2.46 | 2.32 | 2.28 | 2.93 |
| Av. Adsorb. Temp. °F. | 265 | 284 | 261 | 257 | 266 | 285 |
| Test Hours | 15 | 15 | 15 | 15 | 13½ | 14¼ |

| CYCLE NO. | 7 | 8 | 9 | 10 | 11 | 12 |
|---|---|---|---|---|---|---|
| REGENERATION SEGMENT | | | | | | |
| Identification* | | | | | | |
| Start-Up Batch | 1-61-6 | 3-15-6 | 2-75-7 | 1-63-8 | 3-17-8 | 2-77-9 |
| Test Batch | 2-74-6 | 1-62-7 | 3-16-7 | 2-76-8 | 1-64-9 | 3-18-9 |
| Shut-Down Batch | 3-15 | 2-75 | 1-63 | 3-17 | 2-77 | 1-65 |
| Avg. Temp. - °F. | | | | | | |
| Inlet TR3 | 921 | 844 | 831 | 830 | 832 | 845 |
| TR4 | 681 | 689 | | 607 | 618 | 625 |
| Mid TR5 | 615 | 561 | 616 | 555 | 555 | 562 |
| TR6 | 508 | 470 | 567 | 450 | 472 | 483 |
| Outlet TR7 | 486 | 413 | 520 | 399 | 387 | 412 |
| Avg. Dwell Time - hr | 2.0 | 2.1 | 2.75 | 2.45 | 1.92 | 2.37 |
| Off-Gas Composition | | | | | | |
| - Dry Mole % | | | | | | |
| SO$_2$ | 27.4 | 37.6 | 22.2 | 17.5 | 19.9 | 35.9 |
| CO$_2$ | 69.8 | 60.1 | 76.2 | 77.1 | 74.5 | 62.1 |
| N$_2$ | 2.3 | 1.8 | 1.3 | 5.1 | 5.4 | 1.68 |
| CO | 0.47 | 0.45 | 0.39 | 0.3 | 0.2 | 0.32 |
| COS | 0.015 | 0.011 | 0.014 | 0.016 | 0.015 | 0.01 |
| CH$_4$ | — | — | — | — | — | — |
| H$_2$S | — | — | — | — | — | — |
| ADSORPTION SEGMENT | | | | | | |
| Start-Up Batch | | | | | | |
| Identification | 1-62 | 3-16 | 2-76 | 1-64 | 3-18 | 2-78 |
| SO$_2$ Load - lb/100 lb | 3.03 | 3.02 | 3.15 | 2.66 | 2.6 | 2.45 |
| Av. Adsorb. Temp. °F. | 275 | 269 | 268 | 270 | 270 | 275 |
| Test Hours | 15 | 15 | 15 | 15 | 15 | 15 |
| Test Batch | | | | | | |
| Identification | 2-75 | 1-63 | 3-17 | 2-77 | 1-65 | 3-19 |
| SO$_2$ Load - lb/100 lb | 3.13 | 3.09 | 2.95 | 2.61 | 2.81 | 2.55 |
| Av. Adsorb. Temp. °F. | 280 | 262 | 273 | 270 | 275 | 267 |
| Test Hours | 15 | 15 | 15 | 15 | 15 | 13 |

*The first No. designates the batch number the second number indicates the last adsorption run.

TABLE 2

BF CHAR

| CYCLE NO. | 1 | 2 | 3 | 4 | 5 | 6 | 7 |
|---|---|---|---|---|---|---|---|
| REGENERATION SEGMENT | | | | | | | |
| Identification* | | | | | | | |
| Start-Up Batch | 1-1-1 | 3-1-1 | 2-2-2 | 1-3-3 | 3-3-3 | 2-4-4 | 1-5-5 |
| Test Batch | 2-1-1 | 1-2-2 | 3-2-2 | 2-3-3 | 1-4-4 | 3-4-4 | 2-5-5 |
| Shut-Down Batch | 3-1 | 2-2 | 1-3 | 3-3 | 2-4 | 1-5 | 3-5 |
| Avg. Temp. - °F. | | | | | | | |
| Inlet TR3 | 816 | 854 | 844 | 842 | 880 | 905 | 865 |
| TR4 | 607 | 632 | 691 | 627 | 596 | 850 | 470 |
| Mid TR5 | 520 | 616 | 574 | 589 | 447 | 657 | 463 |
| TR6 | 458 | 525 | 541 | 566 | 382 | 509 | 397 |
| Outlet TR7 | 516 | 496 | 540 | 481 | 345 | 349 | 390 |
| Avg. Dwell Time - hr | 1.9 | 2.5 | 1.8 | 2.6 | 1.7 | 1.3 | 1.5 |
| Off-Gas Composition | | | | | | | |
| - Dry Mole % | | | | | | | |
| SO$_2$ | 24.1 | 43.1 | 61.2 | 42.3 | 41.7 | 29.2 | 41.0 |
| CO$_2$ | 72.8 | 55.6 | 37.3 | 53.6 | 56.3 | 62.3 | 57.8 |
| N$_2$ | 2.8 | 0.77 | 0.97 | 3.7 | 1.2 | 7.5 | 0.6 |
| CO | 0.4 | 0.5 | 0.56 | 0.4 | 0.88 | 1.05 | 0.5 |
| COS | 0.014 | 0.009 | 0.01 | 0.01 | 0.013 | 0.011 | 0.013 |
| CH$_4$ | — | — | — | — | — | — | — |
| H$_2$S | — | — | — | — | — | — | — |
| ADSORPTION SEGMENT | | | | | | | |
| Start-Up Batch | | | | | | | |
| Identification: | 1-2 | 3-2 | 2-3 | 1-4 | 3-4 | 2-5 | — |
| SO$_2$ Load - lb/100 lb | 4.85 | 4.84 | 5.24 | 5.0 | 5.27 | 5.53 | — |
| Av. Adsorb. Temp. °F. | 270 | 278 | 273 | 273 | 279 | 273 | — |
| Test Hours | 15 | 15 | 15 | 15 | 15 | 15 | — |

TABLE 2-continued

| CYCLE NO. | BF CHAR | | | | | | |
|---|---|---|---|---|---|---|---|
| | 1 | 2 | 3 | 4 | 5 | 6 | 7 |
| Test Batch Identification | 2-2 | 1-3 | 3-3 | 2-4 | 1-5 | 3-5 | 2-6 |
| SO₂ Load - lb/100 lb | 4.4 | 4.92 | 5.06 | 5.17 | 5.5 | 5.12 | 5.5 |
| Av. Adsorb. Temp. °F. | 268 | 270 | 278 | 275 | 270 | 271 | 273 |
| Test Hours | 15 | 15 | 15 | 15 | 15 | 15 | 15 |

What is claimed is:

1. A process for desulfurizing a flue gas with a carbonaceous adsorbent and reactivating the spent carbonaceous adsorbent, comprising:
   (1) using a partially oxidized coal as the carbonaceous adsorbent and continuously passing the spent adsorbent through a regeneration zone as a non-static bed;
   (2) passing an initial charge of an inert gas into a regenerating gas loop and through the regeneration zone in a direction countercurrent to the flow of the spent adsorbent for contact with the spent adsorbent to desorb adsorbed volatiles including sulfur oxides and water vapor from the spent adsorbent;
   (3) maintaining the temperature of the regeneration zone at the gas inlet within the range of 800°-1000° F. by externally heating and recycling the desorbed volatiles through the regeneration zone whereby a water vapor concentration of at least 40 mole percent and an SO₂ concentration of at least 15 mole % in the regeneration gas loop are maintained and whereby the spent adsorbent is continuously regenerated;
   (4) continuously removing a portion of the gas from the regenerating gas loop at the rate at which volatiles are desorbed to maintain steady-state operation; and
   (5) processing the gas removed from the regenerating gas loop to recover the sulfur value contained therein.

2. The process of claim 1 wherein the gas inlet temperature is 800°-850° F.

3. The process of claim 1 or 2 wherein the adsorbent is a vanadium-containing partially oxidized anthracite coal.

4. The process of claim 1 or 2 wherein said partially oxidized coal has been oxidized to the extent of removal of 40-50% of the original coal.

5. The process of claim 1 or 2 wherein said initial charge is an inert gas selected from the group consisting of nitrogen, carbon dioxide, steam and mixtures thereof.

6. The process of claim 1 or 2 wherein the average solids dwell time within the regeneration zone is 1.5 to 3 hours.

7. The process of claim 1 or 2 wherein the recycled regenerating gas at a steady-rate operation contains at least 50 mole % steam and at least 20 mole % SO₂.

8. A process for desulfurizing a flue gas with a carbonaceous adsorbent and reactivating the spent carbonaceous adsorbent, comprising:
   (1) using a partially oxidized coal as the carbonaceous adsorbent and continuously passing the spent adsorbent through a regeneration zone as a non-static bed;
   (2) passing an initial charge of an inert gas into a regenerating gas loop and through the regeneration zone in a direction countercurrent to the flow of the spent adsorbent for contact with the spent adsorbent to desorb adsorbed volatiles including sulfur oxides and water vapor from the spent adsorbent;
   (3) maintaining the temperature of the regeneration zone at the gas inlet within the range of 800°-1000° F. by externally heating and recycling the desorbed volatiles through the regeneration zone whereby a water vapor concentration of at least 40 mole % and an SO₂ concentration of at least 15 mole % is maintained in the regeneration gas loop and whereby the spent adsorbent is continuously regenerated;
   (4) continuously removing a bleed portion of the gas from the regenerating gas loop at the rate the volatiles are desorbed to maintain steady-state operation;
   (5) continuously feeding said bleed gas portion to a reaction zone containing coal and maintained at a temperature of from 1150° F. to 1550° F. to convert the sulfur dioxide to gaseous elemental sulfur and to partially oxidize the coal;
   (6) continuously removing and condensing said gaseous sulfur from the reaction zone; and
   (7) continuously removing the partially oxidized coal from the reaction zone.

9. The process of claim 8 wherein at least a portion of the partially oxidized coal removed from the reaction zone is recycled for use as adsorbent.

10. The process of claim 8 wherein the gas inlet temperature is 800°-850° F.

11. The process of claim 8 or 10 wherein the adsorbent is a vanadium-containing, partially oxidized anthracite coal.

12. The process of claim 8 or 10 wherein said partially oxidized coal has been oxidized to the extent of removal of 40-50% of the original coal.

13. The process of claim 8 or 10 wherein said initial charge is an inert gas selected from the group consisting of nitrogen, carbon dioxide, steam and mixtures thereof.

14. The process of claim 8 or 10 wherein the average solids dwell time within the regeneration zone is 1.5 to 3 hours.

15. The process of claim 8 or 10 wherein the recycled regenerating gas at a steady-state operation contains at least 50 mole % steam and at least 20 mole % SO₂.

* * * * *